Oct. 12, 1954
J. C. STOKES
2,691,302
PRESSURE MEASURING APPARATUS
Filed Nov. 6, 1950
3 Sheets-Sheet 1
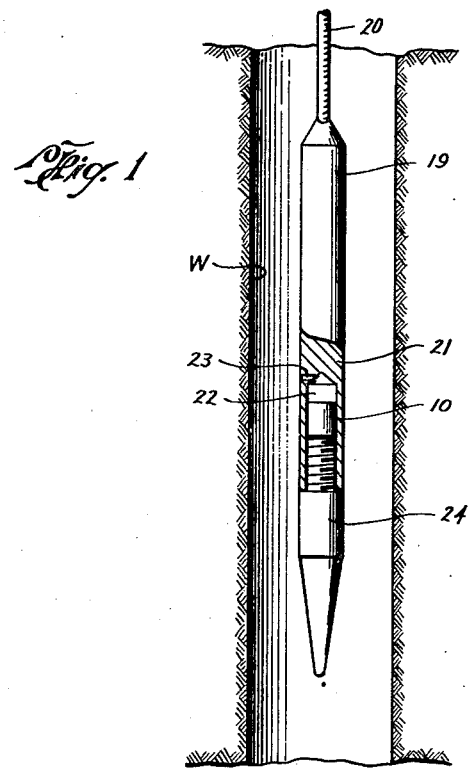
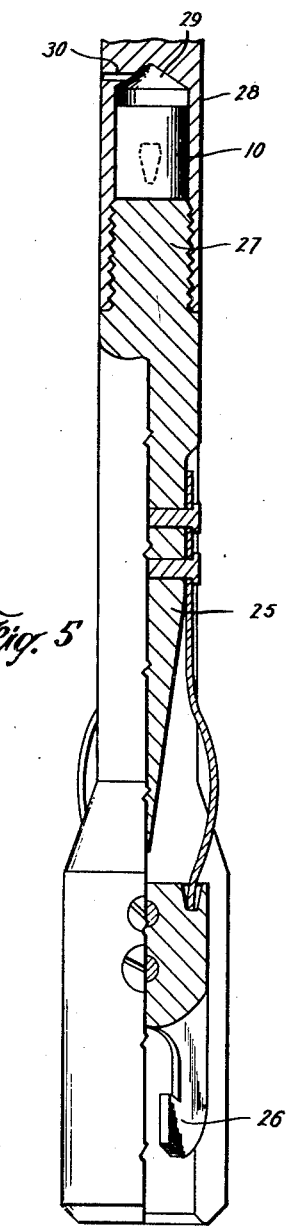
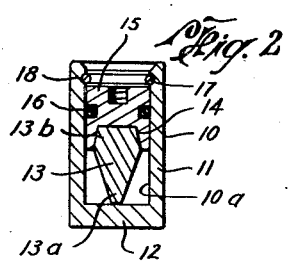
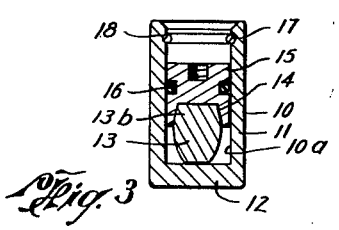
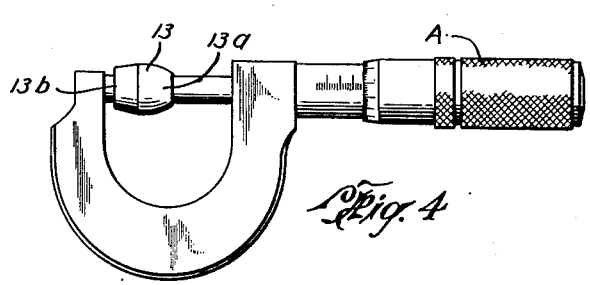
John C. Stokes
INVENTOR.
BY J. Vincent Martin
and
Jod E. Edwards
ATTORNEYS Oct. 12, 1954  J. C. STOKES  2,691,302
PRESSURE MEASURING APPARATUS
Filed Nov. 6, 1950  3 Sheets-Sheet 2
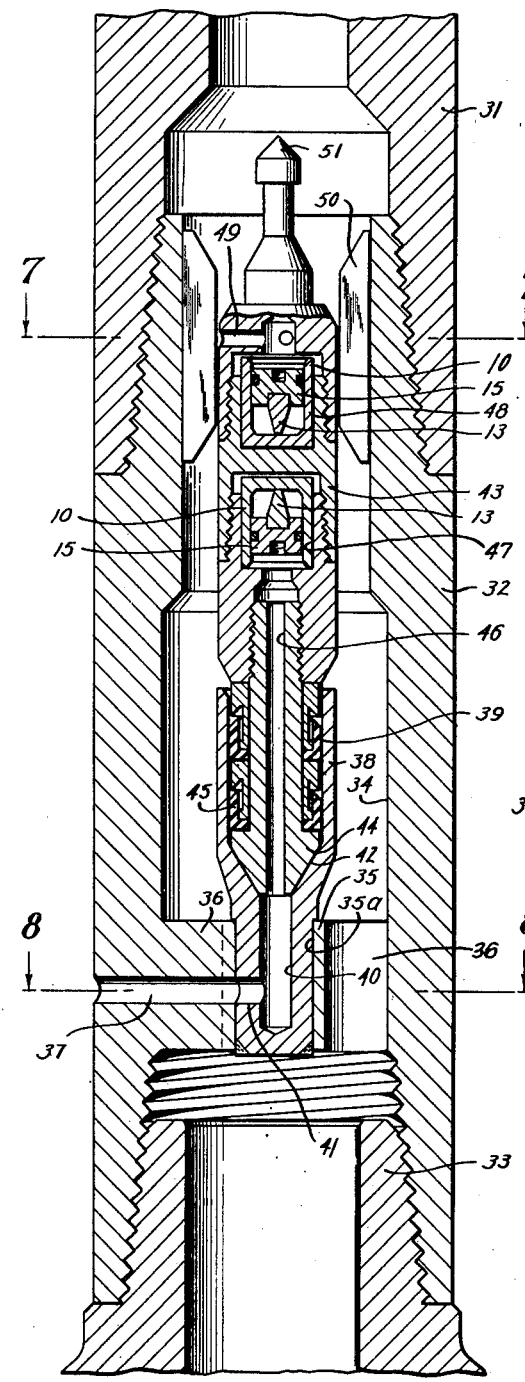
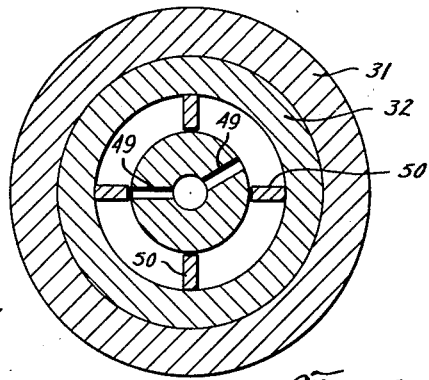
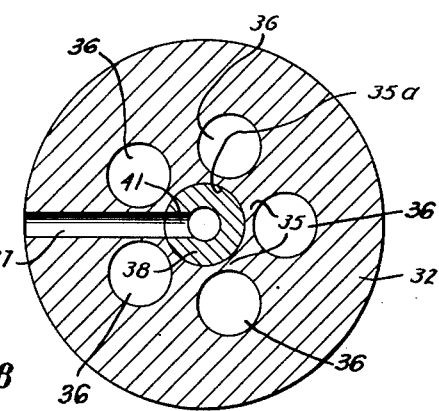
John C. Stokes
INVENTOR.
ATTORNEYS Oct. 12, 1954  J. C. STOKES  2,691,302
PRESSURE MEASURING APPARATUS
Filed Nov. 6, 1950  3 Sheets-Sheet 3
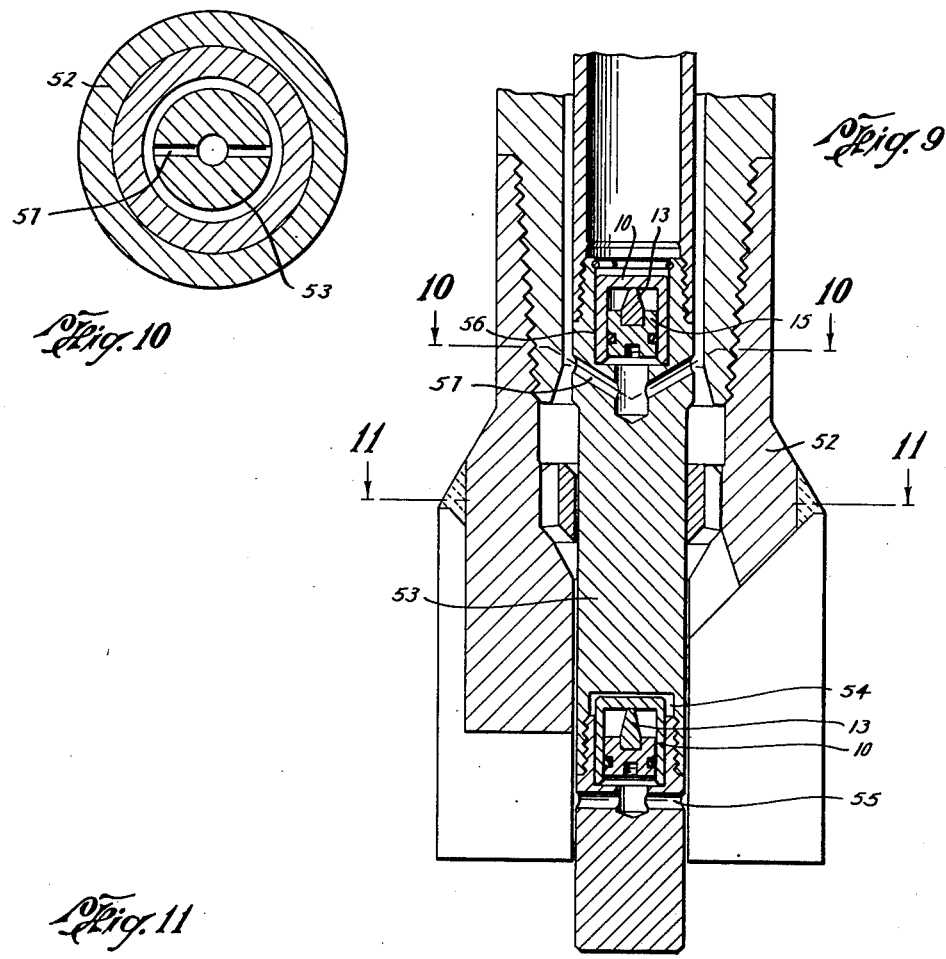

Patented Oct. 12, 1954

2,691,302

UNITED STATES PATENT OFFICE 2,691,302

PRESSURE MEASURING APPARATUS

John C. Stokes, Houston, Tex., assignor to Reed Roller Bit Company, Houston, Tex., a corporation of Texas Application November 6, 1950, Serial No. 194,328

3 Claims. (Cl. 73—151)

1

This invention relates to new and useful improvements in pressure measuring apparatus and relates particularly to apparatus for measuring well bore pressures.

One object of the invention is to provide an improved apparatus for efficiently measuring and determining the pressure which is present within a well bore, with said apparatus being constructed so as to withstand the relatively high pressures which may be encountered in wells.

An important object is to provide a pressure measuring apparatus which may be combined with the usual wire line devices or tools or which may be combined with a drill pipe, either in a permanent manner or as a removable unit, whereby measurement of well pressure, particularly bottom hole well pressure, may be carried out in connection with normal well operations.

A particular object is to provide a measuring apparatus which will simultaneously measure the pressure within a drill pipe and the bottom hole well pressure exteriorly of the drill bit to furnish essential information which is of assistance in the drilling operation.

Another object of the invention is to provide an improved pressure recording apparatus which may be mounted in a pilot bit to form a part of the drill bit assembly or which may be removably supported in a position adjacent the drill bit; the latter installation making it possible to periodically take pressure measurements during the drilling operations and without the necessity of removing the entire drill bit assembly.

Still another object is to provide a pressure measuring apparatus which is mounted in a wire line tool such as an "overshot" or "go-devil" whereby pressure measurements may be effected at any desired time by a wire line operation.

Other objects will hereinafter appear.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a view partly in section and partly in elevation illustrating a pressure measuring apparatus forming part of a wire line "go-devil" or sinker bar, Figure 2 is a sectional view of the pressure

2 measuring unit illustrating the pressure responsive element thereof in its normal position, Figure 3 is a view similar to Figure 2, showing the pressure-responsive element deformed by the application of pressure to the unit, Figure 4 is a view of a micrometer and illustrating the manner of measuring the deformed element to determine the pressure which has been applied thereto, Figure 5 is a view, partly in section and partly in elevation of a pressure measuring apparatus forming part of an "overshot" tool, Figure 6 is a longitudinal sectional view of a drill bit assembly having a dual pressure measuring apparatus removably mounted in the bore of said assembly, Figure 7 is a horizontal, cross-sectional view, taken on the line 7—7 of Figure 6, Figure 8 is a horizontal, cross sectional view, taken on the line 8—8 of Figure 6, Figure 9 is a longitudinal sectional view of a drill bit assembly wherein the pressure measuring unit is mounted in the pilot bit of said bit assembly, Figure 10 is a horizontal, cross-sectional view, taken on the line 10—10 of Figure 9, and Figure 11 is a horizontal cross-sectional view taken on the line 11—11 of Figure 9.

In the drawings the numeral 10 designates a pressure measuring unit which, as shown in Figures 2 and 3, comprises a cylinder 11 having one end 12 closed and its opposite end open. A deformable element 13 which is preferably constructed of a soft metal and which has a general conical or tapered shape is disposed within the cylinder 11 with its smaller end 13a engaging the closed end 12 of the cylinder. The opposite or larger end 13b of the element 13 is confined within a recess 14 formed in a piston 15. The piston is slidable within the bore 10a of the cylinder 10 and a suitable packing ring 16 on said piston seals off with the bore. Outward displacement of the piston from the open end of the cylinder is prevented by means of a snap retaining ring 17 which fits within an annular groove 18 provided in the piston wall adjacent its outer end.

When pressure is applied to the piston 15, this pressure is transmitted to the deformable element 13 and will deform said element in accordance with the amount of applied pressure. The overall initial or normal length of the element 13 is known, and after the unit has been subjected to pressure the deformed element 13 may be measured by means of a micrometer A in the manner illustrated in Figure 4. It will be evident that the change in length of the element, that is, the distance between its ends 13a and 13b, will be representative of the amount of pressure which was applied to the unit.

The unit is rugged in construction and is capable of withstanding the relatively high pressures which are encountered in well bores. In Figure 1, the unit 10 is illustrated as mounted within a "go-devil" or sinker bar assembly 19 which is lowered into a well bore W by means of a wire line 20. The go-devil or sinker bar assembly includes a body 21 having a chamber 22 therein. The upper end of the chamber communicates through a passage 23 with the area exteriorly of the body and the unit 10 is disposed within the chamber with the piston 15 exposed in the upper end of the chamber. A suitable tapered guide 24 is threaded into the lower end of the body 21 to retain the unit 10 in position.

It will be evident that when the assembly 19 is lowered within the well bore W the pressure within the well bore may act through the passage 23 and through the upper portion of the chamber 22 against the piston 15 and will function to deform the element 13 in accordance with the amount of such pressure. Upon removal of the assembly 19 the element 13 may be measured to indicate the pressure. With this arrangement the pressure within the well bore at any point therein may be quickly and easily measured and the use of the flexible line facilitates the measuring operation.

In Figure 5 the unit 10 is shown for measuring well bore pressures in connection with the lowering of an overshot tool 25. This tool is of usual construction and has the latching dogs 26 at its lower end. Connected to the threaded pin 27 of the tool 25 is a housing 28 having a chamber 29 therein. The upper end of this chamber communicates with the area exteriorly of the housing 28 through a passage 30. The operation of this form is identical to that of the form shown in Figure 1, with the unit 10 measuring the pressure which is present within the well bore exteriorly of the overshot tool. As is well known, an overshot tool is employed for retrieving various well tools and with this arrangement a pressure measurement may be made each time that well operations require the lowering of the tool 25.

In Figures 6 to 8 an assembly has been shown for simultaneously measuring the pressure within a drill stem and for measuring the pressure exteriorly of the drill stem adjacent the drill bit. In this form the usual drill pipe 31 has a connecting sub 32 threaded onto its lower end and the usual drill bit 33 is attached to the sub. The sub is provided with an axial bore 34 and the lower end of said bore is closed by a transverse partition 35 having a central opening 35a and a plurality of by-pass openings 36. A radial passage 37 establishes communication between the area exteriorly of the sub and the central opening 35a. A tubular supporting sleeve 38 has its lower end welded or otherwise secured within the central opening of the partition 35 and said sleeve has an axial bore 39 which is reduced at its lower portion as indicated at 40. The reduced portion of the bore has communication through a port 41 with the passage 37 and thus the interior of the lower end of the bore of the sleeve 38 is exposed to well pressure. An annular seat 42 is formed within the sleeve 38 just above the reduced portion 40 of the bore.

A removable housing 43 which may be made up of a plurality of sections threaded together is adapted to be lowered into position so that its lower end will be disposed within the sleeve 38. The lower end of the housing has a seating surface 44 which engages the seat 42 and above the seating surface suitable annular packing elements 45 seal off between the housing and the bore 39 of the sleeve. The lower section of the housing has an axial bore 46 which communicates with a chamber 47 and within this chamber a pressure measuring unit 10 is mounted. Since the axial bore 46 extends from the lower end of the housing 43 the lower end of this bore communicates with the reduced portion 40 of the bore of the sleeve 38 and thus well pressure may enter the bore 46 and act upon the piston 15 of the measuring unit 10. This measuring unit is thus arranged to measure the pressure which is present within the well bore exteriorly of the sub 32 and adjacent the upper end of the drill bit.

Above the chamber 47 the housing 43 is formed with a second chamber 48 and this chamber has a pressure measuring unit 10 mounted therein. The upper portion of the chamber communicates through a radial passage 49 with the bore of the drill pipe 31 and the bore of the sub 32. The piston 15 of the unit 10 which is disposed within the chamber 48 is thus exposed to the pressure within the drill stem. Suitable guide ribs or centering elements 50 may be provided in the upper portion of the sub for maintaining the housing 43 in axial alignment therein. The upper end of the housing has a suitable fishing neck or head 51 secured thereto whereby the housing may be raised or lowered by means of a wire line.

In the operation of the form shown in Figures 6 to 8 the housing 43 is positioned within the sleeve 38 without the units 10 being mounted in their respective chambers 47 and 48. The pumps are then started until normal circulation is established and if desired, drilling may be accomplished by the bit at this time. When it is desired to take a pressure measurement the housing 43 is retrieved by a suitable wire line (not shown) and the measuring units 10 are placed within the chambers 47 and 48, after which the housing 43 is again pumped or lowered into the sub 32 to again seat within the sleeve 38. After the housing 43 is in seated position the pumps are again started to build up the pressure to normal drilling conditions and at such time the lower unit within the chamber 47 will be acted upon by pressure exteriorly of the sub while the upper unit within the chamber 48 will be acted upon by the pressure within the drill string. There is thus obtained a simultaneous measurement of the pressure interiorly and exteriorly of the sub 32. The housing is retrieved after the pressure measurement is made and the deformable elements 13 of the two units 10 are measured by means of the micrometer A or other means to obtain information as to the pressures in the areas under investigation. It is then desirable to return the housing without the units 10 therein so as to close the pasage 37 during normal drilling.

In Figures 9 to 11 another form of the invention is shown wherein the pressure adjacent the bit and within the drill stem may be simultaneously measured. In this form the drill bit assembly includes an outer bit 52 and an inner pilot bit or stem 53. The element 53 has a chamber 54 which communicates through passages 55 with the area exteriorly of and adjacent the bit 52 and one of the measuring units 10 is mounted in this chamber. The element also has an upper chamber 56 which is in communication through passages 57 with the drill stem and the chamber 56 receives one of the pressure measuring units 10. It will be evident that in this form a simultaneous measurement of pressures within the drill stem and exteriorly of the bit adjacent said bit may be accomplished. The inner pilot bit or stem 53 may form a part of the drill bit assembly in which case the pressure units will be retrieved when the drill pipe is pulled to change the bit 52. In both of the forms illustrated in Figures 6 to 11, a simultaneous measurement of the drill stem pressure as well as the pressure exteriorly of the drill bit is accomplished.

The foregoing disclosure and description of the invention is illustrative and explanatory thereof and various changes in the size, shape and materials, as well as in the details of the illustrated construction may be made, within the scope of the claims, without departing from the spirit of the invention.

Having described the invention, I claim:

1. The combination with a tubular sub having an axial bore therethrough and a lateral port extending through its wall, and a tubular seat mounted in the bore of the sub above said port, of a fluid pressure measuring device comprising, a housing adapted to be positioned within said bore and on said seat, a pair of pressure measuring units within said housing, said housing and said seat having fluid passage means for establishing fluid communication from said lateral port to one of the pressure measuring units when said housing is seated on said seat whereby said one of the pressure measuring units is acted upon by the fluid pressure exteriorly of the sub for measuring same, said housing also having fluid passage means for establishing fluid communication between the bore of said sub and the other of the pressure measuring units whereby the fluid pressure within the bore of the sub acts on said other of the pressure measuring units for measuring same.

2. The structure set forth in claim 1, wherein each of said pressure measuring units comprises a cylinder having an open end and a closed end, a piston slidably mounted in said cylinder, and a pressure responsive element of deformable material between the piston and the closed end of the cylinder whereby fluid under pressure passing through the open end of the cylinder acts on the piston to force it toward the closed end of the cylinder for deforming said element, the amount of deformation of said element being indicative of the amount of fluid pressure acting on the piston.

3. The structure set forth in claim 1, including a fishing neck on the upper end of said housing whereby said measuring device can be raised from said seat or lowered thereon by a wire line, and guide ribs extending into the bore of said sub for guiding said housing onto said tubular seat.

References Cited in the file of this patent

UNITED STATES PATENTS

| Number | Name | Date |
| --- | --- | --- |
| 1,523,290 | Rimailho | Jan. 13, 1925 |
| 2,155,635 | Bennett | Apr. 25, 1939 |
| 2,212,547 | Moseman | Aug. 27, 1940 |
| 2,280,785 | Boynton | Apr. 28, 1942 |
| 2,362,484 | Hickman | Nov. 14, 1944 |